United States Patent
Nishimura et al.

(10) Patent No.: US 9,905,833 B2
(45) Date of Patent: Feb. 27, 2018

(54) ENERGY STORAGE APPARATUS

(71) Applicants: GS Yuasa International, Ltd., Kyoto-Shi, Kyoto (JP); Honda Motor Co., Ltd., Tokyo (JP)

(72) Inventors: Yosuke Nishimura, Kyoto (JP); Yoshimasa Toshioka, Kyoto (JP); Masao Kawata, Saitama (JP)

(73) Assignees: GS YUASA INTERNATIONAL LTD., Kyoto-Shi, Kyoto (JP); HONDA MOTOR CO., LTD, Minato-Ku, Tokyo (JP)

( * ) Notice: Subject to any disclaimer, the term of this patent is extended or adjusted under 35 U.S.C. 154(b) by 6 days.

(21) Appl. No.: 14/836,788

(22) Filed: Aug. 26, 2015

(65) Prior Publication Data

US 2016/0064717 A1 Mar. 3, 2016

(30) Foreign Application Priority Data

Aug. 27, 2014 (JP) ................. 2014-173099

(51) Int. Cl.
| | |
|---|---|
| *H01M 4/00* | (2006.01) |
| *H01M 2/20* | (2006.01) |
| *H01R 4/18* | (2006.01) |
| *H01R 11/12* | (2006.01) |

(52) U.S. Cl.
CPC ........ *H01M 2/206* (2013.01); *H01M 2220/20* (2013.01); *H01R 4/187* (2013.01); *H01R 11/12* (2013.01)

(58) Field of Classification Search
CPC ..................................................... H01M 4/00
See application file for complete search history.

(56) References Cited

U.S. PATENT DOCUMENTS

| | | |
|---|---|---|
| 2006/0170394 A1 | 8/2006 | Ha et al. |
| 2011/0308856 A1 | 12/2011 | Park |
| 2012/0019061 A1 | 1/2012 | Nishihara et al. |
| 2012/0208410 A1 | 8/2012 | Ikeda et al. |
| 2012/0231638 A1 | 9/2012 | Ikeda et al. |
| 2013/0000957 A1 | 1/2013 | Ikeda et al. |
| 2013/0010449 A1 | 1/2013 | Ikeda et al. |
| 2013/0189560 A1* | 7/2013 | Widhalm .............. H01M 2/206 429/121 |
| 2014/0017532 A1 | 1/2014 | Nishihara et al. |
| 2014/0113494 A1 | 4/2014 | Kinoshita et al. |

FOREIGN PATENT DOCUMENTS

| | | |
|---|---|---|
| JP | 2010-170884 | * 8/2010 |
| JP | 2011-228216 A | 11/2011 |
| JP | 2011-228217 A | 11/2011 |

(Continued)

*Primary Examiner* — Jacob Marks
(74) *Attorney, Agent, or Firm* — McGinn IP Law Group, PLLC.

(57) ABSTRACT

An energy storage apparatus includes: an energy storage device; a bus bar; and a lead line, wherein the bus bar includes a bus bar body which is in contact with the external terminal of the energy storage device and includes a portion to be connected where the lead line is connected to the bus bar, and other portion which is contiguously formed with the portion to be connected, and the bus bar body has a cut disposed between the portion to be connected and the other portion.

15 Claims, 7 Drawing Sheets

(56) References Cited

FOREIGN PATENT DOCUMENTS

| | | |
|---|---|---|
| JP | 2012-004106 A | 1/2012 |
| JP | 2012-059500 A | 3/2012 |
| JP | 2012-109196 A | 6/2012 |
| JP | 2012-146669 A | 6/2012 |
| JP | 2012-198995 A | 10/2012 |
| JP | 2013-017332 A | 1/2013 |
| JP | 2013-033707 A | 2/2013 |
| JP | 2013-093227 A | 5/2013 |
| JP | 2013-120675 A | 6/2013 |
| JP | 2014-127299 A | 7/2014 |
| JP | 2014-229585 A | 12/2014 |
| WO | WO 2010/113455 A1 | 10/2010 |
| WO | WO-2011-021452 A | 2/2011 |
| WO | WO-2012/133592 A | 10/2012 |

\* cited by examiner

ENERGY STORAGE APPARATUS

CROSS-REFERENCE TO RELATED APPLICATIONS

This application claims the benefit of Japanese patent application No. 2014-173099, filed on Aug. 27, 2014, which is incorporated by reference.

FIELD

The present invention relates to an energy storage apparatus which includes an energy storage device.

BACKGROUND

An electric vehicle requires a power source having a large capacity and hence, an energy storage apparatus which includes a plurality of energy storage devices is used. As shown in FIG. 12, an energy storage apparatus of this type includes: bus bars 103 each of which electrically connects external terminals 102 of energy storage devices 101 arranged adjacently to each other. A lead line 104 for detecting voltage information, temperature information and the like of the energy storage device 101 is connected to each bus bar 103 through a terminal 105 provided to a distal end of the lead line 104 (see JP-A-2013-33707). The terminal 105 includes: a plate-shaped terminal body 106 which is fixed to the bus bar 103 by allowing the external terminal 102 to pass through the terminal body 106 in a state where the terminal body 106 overlaps with the bus bar 103 and by fastening a nut to the external terminal 102; and an extending portion 107 which extends from the terminal body 106 and to which the lead line 104 is connected.

In recent years, to satisfy a demand for the reduction of weight of the energy storage apparatus 100, there may be a case where the lead line 104 is directly joined to the bus bar 103 by welding without providing the terminal 105 to the distal end of the lead line 104. In this case, as shown in FIG. 13, an extending portion 111 extending from a bus bar body 110 (a portion corresponding to a conventional bus bar) in a direction along a surface on which the bus bar body 110 is arranged is formed on the bus bar body 110, and the lead line 104 is joined to the extending portion 111 by welding. In this case, when the lead line 104 moves freely a disconnection of the lead line 104 is liable to occur at a boundary portion between the lead line 104 and a weld portion. Accordingly, usually a lead line fixing portion 112 which fixes the lead 104 in the vicinity of the weld portion by swaging or the like is mounted on the extending portion 111.

However, when the extending portion 111 having the above-mentioned configuration is provided to the bus bar 103A, a size of the bus bar 103A in the direction along the arrangement surface becomes large and hence, a large mounting space becomes necessary at the time of mounting the bus bar 103A.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Accordingly, an object of the present invention is to provide an energy storage apparatus having the configuration which enables the miniaturization of a bus bar to which a lead line is connected.

An energy storage apparatus according to an aspect of the present invention includes: an energy storage device including an external terminal; a bus bar electrically connected to the external terminal of the energy storage devices; and a lead line electrically connected to the bus bar, wherein the bus bar includes a bus bar body which is in contact with the external terminal of the energy storage device and includes a portion to be connected where the lead line is connected to the bus bar, and other portion which is contiguously formed with the portion to be connected, and the bus bar body has a cut disposed between the portion to be connected and the other portion.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
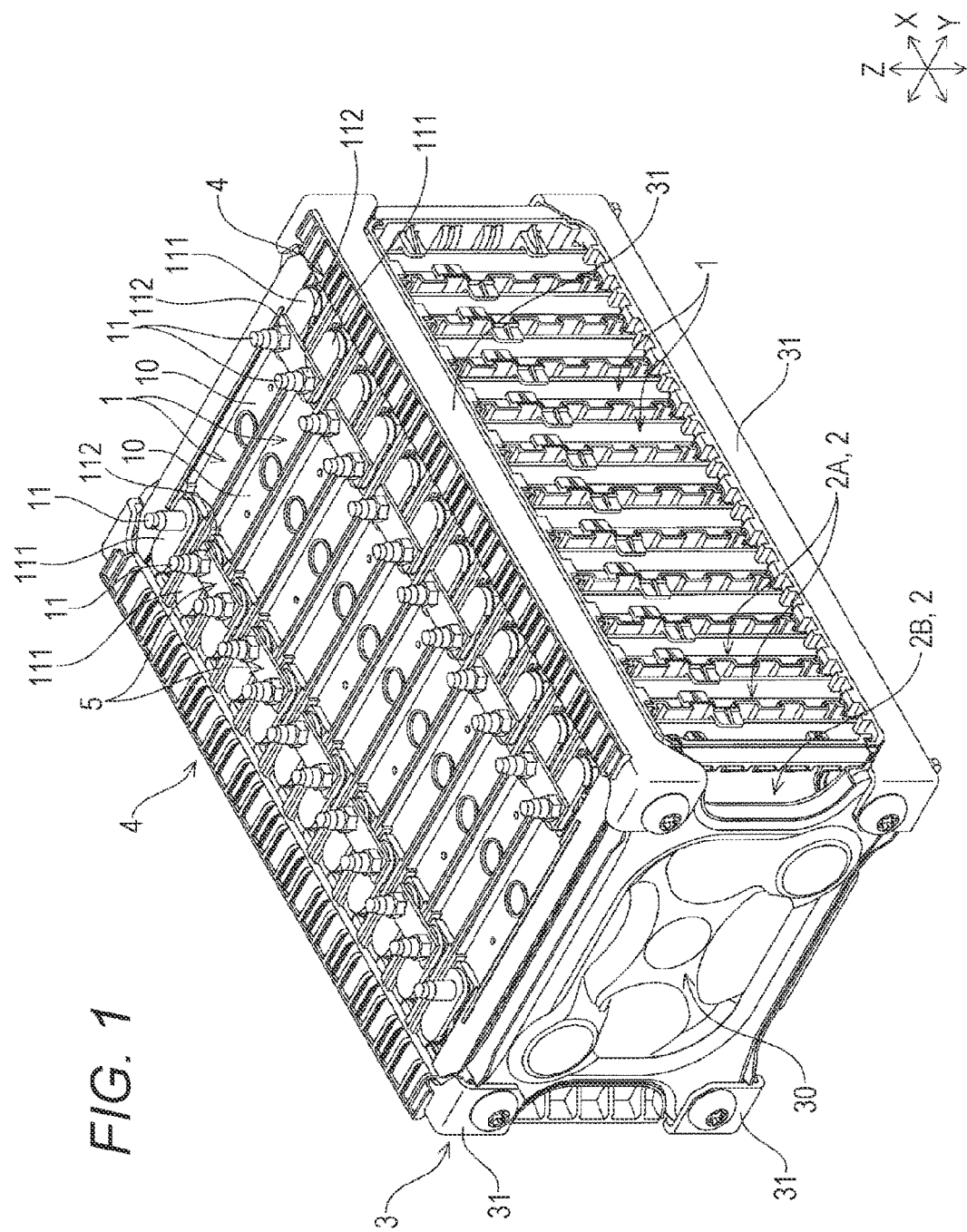
FIG. 1 is a perspective view of an energy storage apparatus according to a first embodiment of the present invention.

According to an aspect of the present invention, there is provided an energy storage apparatus including: an energy storage device including an external terminal; a bus bar electrically connected to the external terminal of the energy storage device; and a lead line electrically connected to the bus bar, wherein the bus bar includes a bus bar body which is in contact with the external terminal of the energy storage device and includes a portion to be connected where the lead line is connected to the bus bar, and other portion which is contiguously formed with the portion to be connected, and the bus bar body has a cut disposed between the portion to be connected and the other portion.

With this configuration, the miniaturization of the bus bar can be realized compared to a case where the portion to be connected is disposed outside the bus bar body.

In the energy storage apparatus, the bus bar may include an extending portion extending from the bus bar body, and having a fixing portion which fixes the lead line.

In the case where the bus bar includes the extending portion, the connecting portion is provided to the bus bar body and hence, it is unnecessary to form a space for the connecting portion in the extending portion whereby the extending portion can be shortened thus realizing the miniaturization of the bus bar.

In this case, the portion to be connected is preferably connected with the extending portion.

With this configuration, a distance between the connecting portion and a portion of the lead line fixed by the fixing portion of the extending portion becomes small and hence, the lead line positioned between the connecting portion and the fixing portion becomes more difficult to move. Accordingly, a disconnection of the lead line at the end portion of the connecting portion or the like can be prevented more effectively.

In ultrasonic welding, it is likely that vibrations or the like generated by ultrasonic in the connecting portion propagate to portions other than the connecting portion, and strain or the like generated in the connecting portion propagates to portions other than the connecting portion. Accordingly, when the lead line is connected to the bus bar by ultrasonic welding, by forming the cut between the portion to be connected and the other portion arranged along the edge of the bus bar body, an effect of welding exerted on other portion from the portion to be connected can be suppressed more effectively.

It is preferable that the energy storage device include a first energy storage device including a first external terminal and a second energy storage device including a second external terminal, the bus bar body include a first terminal connecting portion to which the first external terminal is connected and a second terminal connecting portion to which the second external terminal is connected, and the cut be formed in the bus bar body outside a region ranging from the first terminal connecting portion to the second terminal connecting portion in a direction in which the first terminal connecting portion and the second terminal connecting portion are arranged.

With such a configuration, unlike the case where a cut is formed in a region of the bus bar body where a large amount of electric current flows (the region ranging from one terminal connecting portion to the other terminal connecting portion, that is, between the external terminals of the different energy storage devices), there is no reduction of a cross-sectional area in the region (the cross-sectional area of an electric current path) and hence, conductive performance of the bus bar body can be maintained even when the cut is formed.

According to another aspect of the present invention, there is provided an energy storage apparatus including: an energy storage device including an external terminal; a bus bar electrically connected to the external terminal of the energy storage devices; and a lead line electrically connected to the bus bar, wherein the bus bar includes: a bus bar body which is overlapped with the external terminal of the energy storage device and is in contact with the external terminal; and an extending portion which extends from the bus bar body and has a connecting portion connected with the lead line, and the extending portion is disposed in a region where the extending portion overlaps with the bus bar body as viewed in a direction in which the external terminal and the bus bar body overlap with each other.

With this configuration, the extending portion is formed in the region where the extending portion overlaps with the bus bar body and hence, it is unnecessary to extend the extending portion in the direction along the surface on which the bus bar body is arranged. Accordingly, the miniaturization of the bus bar can be realized. To be more specific, the miniaturization of the bus bar from which the extending portion extends in the direction along the arrangement surface can be realized.

In the energy storage apparatus, the connecting portion may be formed on a surface of the bus bar which is in contact with the external terminal.

As has been explained heretofore, according to the present invention, it is possible to provide an energy storage apparatus having the configuration which enables the miniaturization of a bus bar to which a lead line is connected.

Hereinafter, first and second embodiments of an energy storage apparatus of the present invention are described with reference to drawings. Names of respective components (respective constitutional elements) used in this embodiment are exclusively for this embodiment, and may differ from names of components (respective constitutional elements) used in BACKGROUND.

Firstly the energy storage apparatus of the first embodiment is described.

As shown in FIG. 1, the energy storage apparatus includes energy storage devices 1, spacers 2 which are arranged adjacently to the energy storage devices 1, and a holder 3 which collectively holds the energy storage devices 1 and the spacers 2.

The energy storage device 1 includes: an electrode assembly (not shown in the drawing) which includes a positive electrode and a negative electrode; a case 10 which houses the electrode assembly; and a pair of external terminals 11 arranged on an outer surface of the case 10. In this embodiment, a bolt terminal to which a nut 112 is threadedly engaged is adopted as the external terminal 11. To be more specific, the energy storage device 1 includes connecting rods 111 which are arranged on the outer surface of the case, and are electrically connected to a pair of electrodes. The external terminal 11 projects outside from the connecting rod 111.

The energy storage apparatus according to this embodiment includes a plurality of energy storage devices 1. The plurality of energy storage devices 1 are arranged in a row in one direction. The energy storage apparatus includes: bus bars 5 each of which electrically connects the external terminals 11 of two adjacently arranged energy storage devices 1 to each other; and lead lines 9 which are electrically connected to the bus bars 5, and transmit voltage information and the like to a control device (so-called BMU not shown in the drawing) therethrough (see FIG. 2 and FIG. 3).

In the description made hereinafter, for the sake of convenience, the direction (first direction) along which the energy storage devices 1 are arranged in a row is referred to as the X axis direction. Further, out of two axial directions which are orthogonal to the direction (X axis direction) along which the energy storage devices 1 are arranged in a row, one direction (second direction) is referred to as the Y axis direction, and the remaining one direction (third direction) is referred to as the Z axis direction. In accordance with such a coordinate system, in FIG. 1, three orthogonal axes (coordinate axes) which respectively correspond to the X axis direction, the Y axis direction and the Z axis direction are described complementarily.

The energy storage apparatus includes, as the spacers 2, spacers 2A each of which is arranged between two energy storage devices 1; and spacers 2B which are arranged adjacently to the energy storage devices 1 arranged at outermost ends out of the plurality of the energy storage devices 1. A passage for cooling is formed between the spacer 2 and the energy storage device 1.

The holder 3 includes: a pair of end plates 30 arranged adjacently to the endmost spacers 2B; and frames 31 which connect the pair of end plates 30 to each other. The holder 3 surrounds the energy storage devices 1 and the spacers 2 by the end plates 30 and the frames 31 and holds the energy storage devices 1 and the spacers 2 at predetermined positions.

The bus bar 5 is made of a material having conductivity. To be more specific, the bus bar 5 is made of metal.

Figure 2:
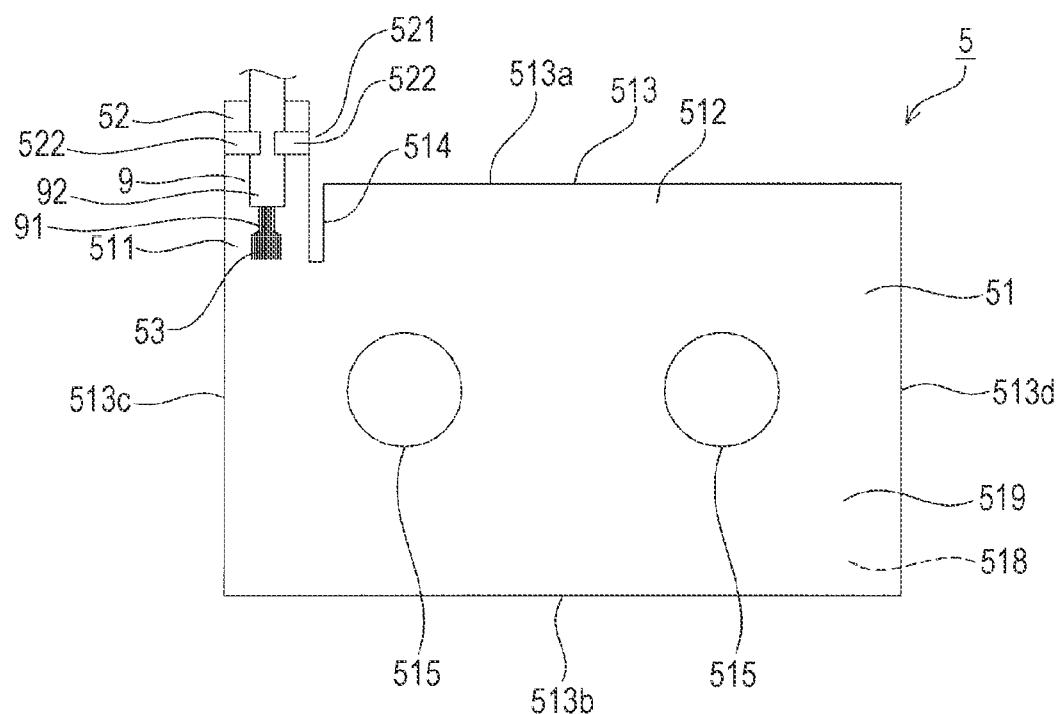
FIG. 2 is a plan view of a bus bar of the energy storage apparatus.
Figure 3:
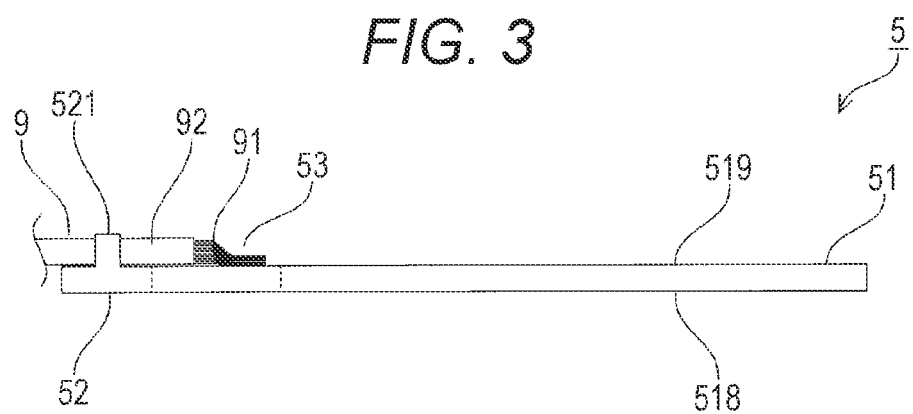
FIG. 3 is a side view of the bus bar.

In this embodiment, as shown in FIG. 2 and FIG. 3, the bus bar 5 includes: a bus bar body 51; and an extending portion 52. The bus bar body 51 includes: a portion to be connected 511; and the other portion 512 other than the portion to be connected 511.

The bus bar body 51 is formed into a desired shape. In this embodiment, the bus bar body 51 is formed into a rectangular plate shape. The bus bar body 51 has: a first surface 518; and a second surface 519 on a side opposite to the first surface 518. The first surface 518 is a surface (portion) which is in contact with the connecting rods 111.

The bus bar body 51 has an edge 513. The edge 513 forms the whole outer profile of the bus bar body 51, and surrounds the portion to be connected 511 and the other portion 512. That is, the edge 513 forms the outermost periphery of the bus bar body 51 which collectively surrounds the portion to be connected 511 and the other portion 512.

In this embodiment, the edge 513 is formed in conformity with a shape of the bus bar body 51. In this embodiment, the edge 513 is formed by connecting four sides. That is, the edge 513 has: a first side 513a; a second side 513b which is arranged parallel to the first side 513a on a side opposite to the first side 513a; a third side 513c which connects one end of the first side 513a and one end of the second side 513b which are disposed opposite to each other; and a fourth side 514d which connects the other end of the first side 513a and the other end of the second side 513b which are disposed opposite to each other, the fourth side 514d being arranged parallel to the third side 513c on a side opposite to the third side 513c.

A cut 514 is formed in the bus bar body 51. The cut 514 extends straightly toward the second side 513b from the first side 513a without reaching the second side 513b. The cut 514 divides the bus bar body 51 into the portion to be connected 511 where a connecting portion 53 between the lead line 9 and the bus bar 5 is formed, and the other portion 512 other than the portion to be connected 511. That is, the cut 514 forms a gap between the portion to be connected 511 and the other portion 512 (a region of the bus bar body 51 around a pair of terminal connecting portions 515).

The portion to be connected 511 and the other portion 512 are connected to each other at a position more inside of the bus bar body 51 than the edge 513. To be more specific, the portion to be connected 511 and the other portion 512 are connected to each other more on a second side 513b side of the bus bar body 51 than the cut 514.

The portion to be connected 511 is arranged at a corner portion of the bus bar body 51 including an intersecting point between the first side 513a and the third side 513c. The portion to be connected 511 has a region to which the lead line 9 is electrically connected. To be more specific, the lead line 9 is electrically connected to the portion to be connected 511, and the connecting portion 53 is formed by such an electrical connection. That is, the connecting portion 53 between the bus bar 5 and the lead line 9 is formed on the bus bar body 51. The portion to be connected 511 and the lead line 9 are electrically connected to each other by joining a distal end (a portion of the distal end which is not covered by an insulating film so that a metal line is exposed) 91 of the lead line 9 to the portion to be connected 511 by ultrasonic welding, for example. The distal end 91 of the lead line 9 is joined to the second surface 519 of the portion to be connected 511 by ultrasonic welding, for example.

The other portion 512 other than the portion to be connected 511 forms a tangible portion continuously formed with the portion to be connected 511. The pair of terminal connecting portions 515 to which the external terminals 11 of the energy storage devices 1 are connected is formed on the other portion 512.

The cut 514 straightly extends toward the second side 513b (toward the inside) from the first side 513a of the edge 513 perpendicular to the first side 513a. The cut 514 does not form a portion of the edge 513. As shown in FIG. 2, a length of the cut 514 is larger than a length of the distal end 53 in the direction that the distal end 53 of the lead line 9 extends.

Figure 4:
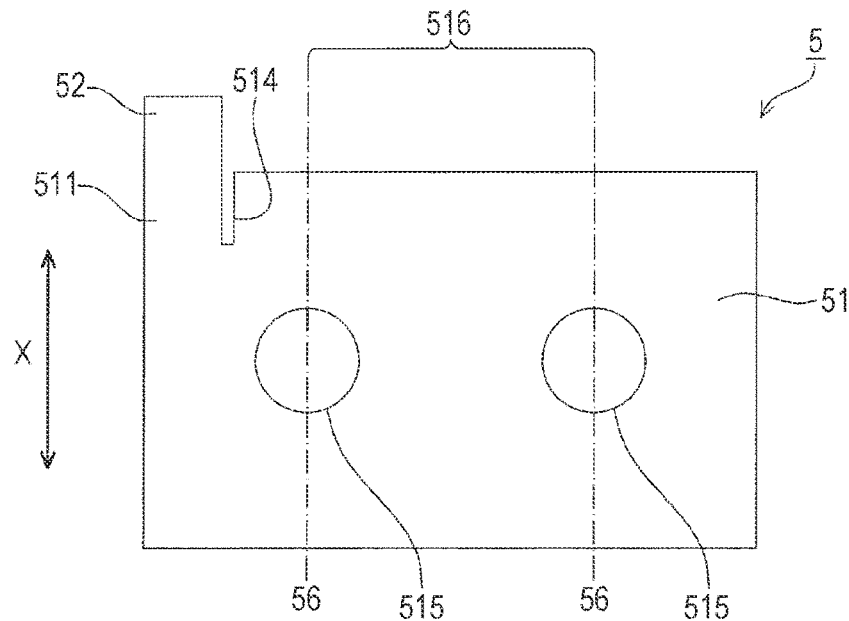
FIG. 4 is a plan view of the bus bar.
Figure 5:
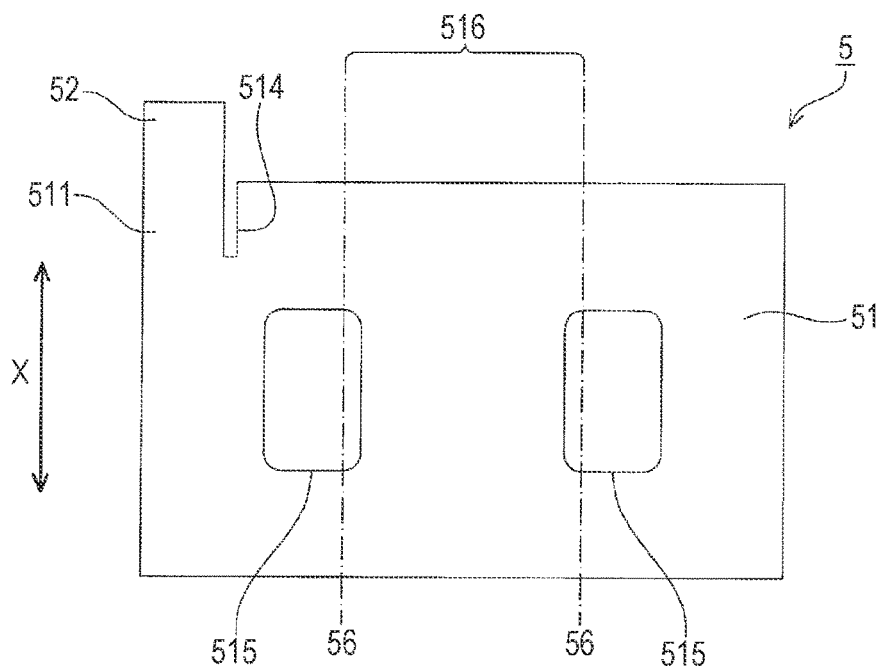
FIG. 5 is a plan view of the bus bar.

As shown in FIG. 4 and FIG. 5, the cut 514 is disposed outside a region 516 ranging from one terminal connecting portion 515 to the other terminal connecting portion 515 in the direction that the pair of terminal connecting portions 515 is arranged (in the lateral direction in FIG. 4 and FIG. 5). That is, the pair of terminal connecting portions 515 is arranged such that the region 516 does not overlap with the cut 514. The region 516 is a region defined between imaginary lines 56 which traverse portions of the respective terminal connecting portions 515 having the largest length in the X axis direction. For example, as shown in FIG. 4, when the respective terminal connecting portions 515 has a circular shape, the region 516 is a region defined between imaginary lines 56 which overlap with diameters of the circular shapes traversing in the X axis direction. For example, as shown in FIG. 5, when the respective terminal connecting portions 515 has a rectangular shape having four arcuately chamfered corners, the region 516 is a region defined between imaginary lines 56 each of which is closest to the other terminal connecting portion 515 out of imaginary lines which traverse portions of the respective terminal connecting portions 515 having the largest length in the X axis direction.

The pair of terminal connecting portions 515 is formed of through holes into which bolt terminals of two adjacently arranged external terminals 11 of two adjacently arranged energy storage devices 1 are inserted. The pair of terminal connecting portions 515 is formed corresponding to shapes, sizes and the arrangement of the bolt terminals of the respective external terminals 11. The bus bar 5 is electrically connected to the external terminals 11 and the connecting rods 111 by threadedly engaging the nuts 112 with the bolt terminals 11 in a state where the bolt terminals (external terminals) 11 are inserted into the terminal connecting portions 515.

The extending portion 52 projects outward from the portion to be connected 511 of the bus bar body 51 in the direction perpendicular to the first side 513a. The extending portion 52 is coplanar with the bus bar body 51. That is, the extending portion 52 is connected to the portion to be connected 511 in the same direction as the direction that the cut 514 extends. To be more specific, the extending portion 52 extends toward the outside of the first side 513a perpendicular to the first side 513a from a corner portion including an intersecting point between the first side 513a and the third side 513c. The extending portion 52 is formed integrally with the bus bar body 51. In this embodiment, the extending portion 52 has a rectangular shape. The extending portion 52 includes a fixing portion 521 for fixing the lead line 9. The fixing portion 521 fixes the lead line 9 such that a pair of projecting portions 522 projecting to both lateral sides from the extending portion 52 is bent laterally inward. That is, the lead line 9 is fixed to the extending portion 52 such that an insulating portion (a portion covered by the insulating film) 92 of the lead line 9 is sandwiched between the extending portion 52 and the bent projecting portions 522.

The bus bar 5 is formed such that the bus bar 5 is punched or cut out from one metal plate such that the bus bar 5 includes the bus bar body 51 and the extending portion 52 and, thereafter, the respective projecting portions 522 of the extending portion 52 are bent.

The connection between the bus bar 5 and the lead line 9, and the mounting of the bus bar 5 to the respective energy storage devices 1 are performed as follows, for example. Firstly, the distal end 91 of the lead line 9 is joined to the portion to be connected 511 of the bus bar body 51 by ultrasonic welding. By such joining by ultrasonic welding, the connecting portion 53 is formed. Next, the insulating portion 92 of the lead line 9 is placed on the extending portion 52, and the lead line 9 is fixed by bending the projecting portions 522. Next, two adjacently arranged bolt terminals (external terminals) 11 of two adjacently arranged energy storage devices 1 are inserted into the pair of terminal connecting portions 515 respectively and the nuts 112 are threadedly engaged with the bolt terminals 11. Due to such operations, the bus bar 5 is electrically connected to the respective external terminals 11 and the connecting rods 111 and is fixed to the respective external terminals 11.

As described above, the energy storage apparatus of this embodiment includes: the energy storage devices 1 each having the external terminals 11; the bus bars 5 electrically connected to the external terminals 11 of the energy storage devices 1; and the lead lines 9 electrically connected to the bus bars 5. The bus bar 5 includes the bus bar body 51 which is in contact with the external terminals 11 of the energy storage devices 1. The connecting portion 53 between the bus bar 5 and the lead line 9 is formed on the bus bar body 51, The bus bar body 51 includes: the portion to be connected 511 where the connecting portion 53 is formed; and the other portion 512, and the bus bar body 51 also includes the edge 513 formed by the portion to be connected 511 and the other portion 512. The portion t connected 511 and the other portion 512 are connected to each other more inside of the bus bar body 51 than the edge 513. The cut 514 is formed in the bus bar body 51 at a position between the portion to be connected 511 and the other portion 512.

With such a configuration, the miniaturization of the bus bar 5 can be realized compared to the case where the portion to be connected 511 is disposed outside the bus bar body 51. Further, the cut 514 is formed in the bus bar body 51 and hence, it is possible to prevent the propagation of a stress or a thermal effect exerted on the lead line 9 to other portion 512.

In the energy storage apparatus of this embodiment, the bus bar 5 includes the extending portion 52 extending from the bus bar body 51 and having the fixing portion 521 which fixes the insulating portion 92 of the lead line 9.

The bus bar 5 includes the extending portion 52, and the connecting portion 53 is formed on the bus bar body 51 and hence, it is unnecessary to form a space for the connecting portion 53 in the extending portion 52 whereby a length of the extending portion 52 can be shortened. Accordingly the miniaturization of the bus bar 5 can be realized.

In the energy storage apparatus of this embodiment, the portion to be connected 511 is connected with the extending portion 52.

With such a configuration, a distance between the connecting portion 53 and a portion of the lead line 9 fixed by the fixing portion 521 of the extending portion 52 becomes small and hence, the lead line 9 positioned between the connecting portion 53 and the fixing portion 521 more minimally moves. Accordingly, the disconnection of the lead line 9 at an end portion of the connecting portion 53 or the like can be prevented more effectively.

As in the case of this embodiment, when the portion to be connected 511 and the lead line 9 are connected to each other by ultrasonic welding, it is likely that vibrations or the like generated by ultrasonic in the connecting portion 53 propagates to portions other than the connecting portion 53, and strain or the like generated in the connecting portion 53 propagates to portions other than the connecting portion 53. Accordingly, when the connecting portion 53 is formed by ultrasonic welding, by forming the cut 514 between the portion to be connected 511 and the other portion 512 arranged along the edge 513 of the bus bar body 51, an effect of ultrasonic welding exerted on the other portion 512 from the portion to be connected 511 can be suppressed more effectively.

In the energy storage apparatus of this embodiment, the bus bar body 51 includes the pair of terminal connecting portions 515 to which the external terminals 11 are connected. The cut 514 is formed in the bus bar body 51 outside the region 516 ranging from one terminal connecting portion 515 to the other terminal connecting portion 515 in a direction that the pair of terminal connecting portions 515 is arranged.

With such a configuration, unlike the case where the cut 514 is formed in a region of the bus bar body 51 where a large amount of electric current flows (the region 516 ranging from one terminal connecting portion 515 to the other terminal connecting portion 515, that is, the region between the external terminals 11 of the different energy storage devices 1), a cross-sectional area of the region 516 (the cross-sectional area of an electric current path) is not decreased and hence, conductive performance of the bus bar body 51 can be maintained even when the cut 514 is formed in the bus bar body 51.

Next, an energy storage apparatus of the second embodiment is described with reference to drawings. With respect to the description of constitutional elements other than bus bars 5, the description of these constitutional elements is substituted by the description of the corresponding constitutional elements of the first embodiment.

In the energy storage apparatus of this embodiment, a connecting portion 53 between the bus bar 5 and a lead line 9 is not formed on a bus bar body 51. Instead, the connecting portion 53 is formed on an extending portion 54, and the extending portion 54 is formed in a region where the extending portion 54 overlaps with the bus bar body 51. The configuration other than the above-mentioned configuration is substantially equal to the corresponding configuration of the first embodiment.

Figure 6:
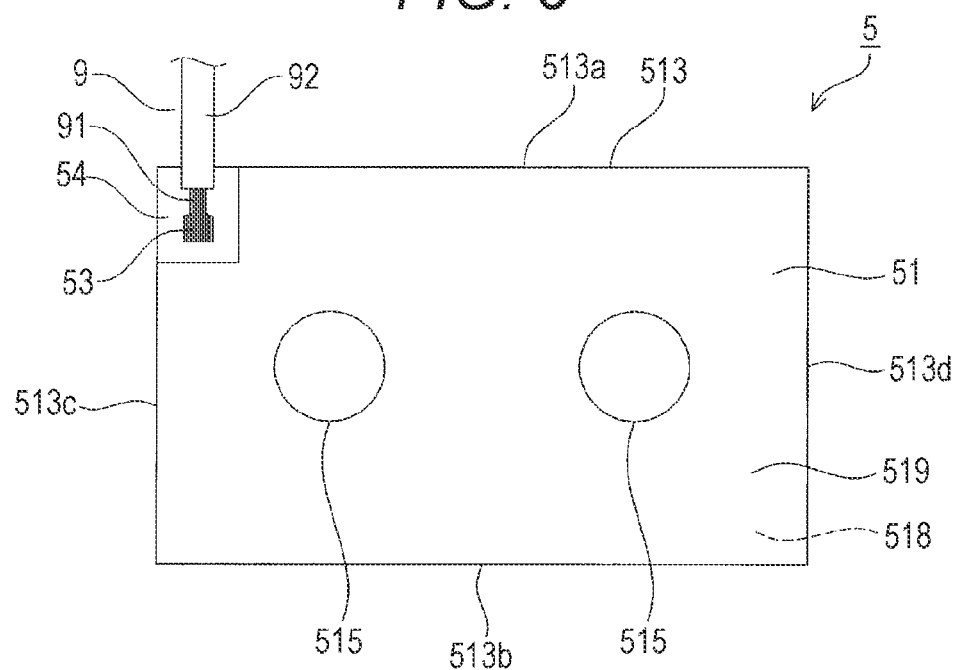
FIG. 6 is a plan view of a bus bar of an energy storage apparatus according to a second embodiment of the present invention.
Figure 7:
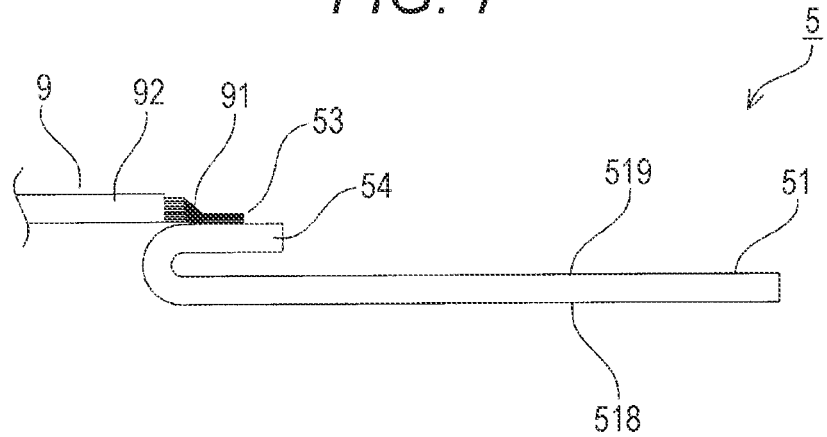
FIG. 7 is a side view of the bus bar.

To be more specific, in the energy storage apparatus of this embodiment, as shown in FIG. 6 and FIG. 7, the bus bar 5 includes: the bus bar body 51; and the extending portion 54 extending from the bus bar body 51 and having the connecting portion 53 connected with the lead line 9. The extending portion 54 is disposed in the region where the extending portion 54 overlaps with the bus bar body 51.

In the same manner as the first embodiment, the bus bar body 51 is formed into a desired shape. In this embodiment, the bus bar body 51 is formed into a rectangular plate shape. The bus bar body 51 has: a first surface 518; and a second surface 519 on a side opposite to the first surface 518. The first surface 518 is a surface (portion) which is in contact with the connecting rods 111.

In the same manner as the first embodiment, the bus bar body 51 has an edge 513. The edge 513 forms the whole outer profile of the bus bar body 51, and surrounds a portion to be connected 511 and the other portion 512. That is, the edge 513 forms an outermost periphery of the bus bar body 51 which collectively surrounds the portion to be connected 511 and the other portion 512.

In this embodiment, in the same manner as the first embodiment, the edge 513 is formed in conformity with a shape of the bus bar body 51. In this embodiment, the edge 513 is formed by connecting four sides. That is, the edge 513 has: a first side 513a; a second side 513b which is arranged parallel to the first side 513a on a side opposite to the first side 513a; a third side 513c which connects one end of the first side 513a and one end of the second side 513b which are disposed opposite to each other; and a fourth side 514d which connects the other end of the first side 513a and the other end of the second side 513b which are disposed opposite to each other, the fourth side 514d being arranged parallel to the third side 513c on a side opposite to the third side 513c.

The extending portion 54 projects outward in the direction perpendicular to the first side 513a from one end portion of the first side 513a of the bus bar body 51, and the extending portion 54 is bent such that the extending portion 54 overlaps with the region of the bus bar body 51. To be more specific, the extending portion 54 projects toward the outside of the first side 513a perpendicular to the first side 513a from a corner portion including an intersecting point between the first side 513a and the third side 513c, and is bent so as to extend toward the second side 513b. The extending portion 54 is formed integrally with the bus bar body 51. In this embodiment, the extending portion 54 has a rectangular shape. The extending portion 54 is bent so as to be positioned approximately parallel to the bus bar body 51. With such a configuration, a gap is formed between the extending portion 54 on which the connecting portion 53 is formed and the bus bar body 51.

The connecting portion 53 is formed on a first surface 518 (the first surface 518 of the extending portion 54) of the bus bar 5 which is in contact with the external terminals 11 and the connecting rods 111. The first surface 518 of the extending portion 54 and a distal end 91 of the lead line 9 are electrically connected to each other by ultrasonic welding, for example.

In this embodiment, the extending portion 54 is disposed outside a region 516 ranging from one terminal connecting portion 515 to the other terminal connecting portion 515 in the direction that the pair of terminal connecting portions 515 is arranged (see FIG. 4 and FIG. 5). That is, the pair of terminal connecting portions 515 is disposed at positions where the region 516 does not overlap with the extending portion 54.

The bus bar 5 is formed such that the bus bar 5 is punched or cut out from one metal plate such that the bus bar 5 includes the bus bar body 51 and the extending portion 54 and, thereafter, the extending portion 54 is bent.

The connection between the bus bar 5 and the lead line 9, and the mounting of the bus bars 5 on the respective energy storage devices 1 are performed as follows, for example. Firstly a distal end (a portion of the distal end which is not covered by an insulating film, so that a metal line is exposed) 91 of the lead line 9 is joined by ultrasonic welding to the first surface 518 of the extending portion 54 which is not in a bent state. Due to such joining by ultrasonic welding, the connecting portion 53 is formed. Next, the extending portion 54 is bent such that the extending portion 54 overlaps with the bus bar body 51, and a gap is formed between the extending portion 54 and the bus bar body 51. Next, two adjacently arranged bolt terminals (external terminals) 11 of two adjacently arranged energy storage devices 1 are inserted into the pair of terminal connecting portions 515 respectively and the nuts 112 are threadedly engaged with the bolt terminals 11. Due to such operations, the bus bar 5 is electrically connected to the respective external terminals 11, and the bus bar 5 is fixed to the respective external terminals 11.

The energy storage apparatus of this embodiment includes: the energy storage devices 1 each having external terminals 11; the bus bars 5 electrically connected to the external terminals 11 of the energy storage devices 1; and the lead lines 9 electrically connected to the bus bars 5. The bus bar 5 includes: the bus bar body 51 which is in contact with the external terminals 11 of the energy storage devices 1; and the extending portion 54 which extends from the bus bar body 51, and has the connecting portion 53 connected with the lead line 9. The extending portion 54 is disposed in the region where the extending portion. 54 overlaps with the bus bar body 51.

With such a configuration, the extending portion 54 is formed in the region where the extending portion 54 overlaps with the bus bar body 51 and hence, it is unnecessary to extend the extending portion 54 in the direction along the surface on which the bus bar body 51 is arranged. Accordingly, the miniaturization of the bus bar 5 can be realized. To be more specific, the miniaturization of the bus bar 5 in the direction along the arrangement surface can be realized. Further, the gap is formed between the bus bar body 51 and the extending portion 54 on which the connecting portion 53 is formed and hence, it is possible to suppress the propagation of a stress or a thermal effect exerted on the lead line 9 to the bus bar body 51.

It is needless to say that the energy storage apparatus according to the present invention is not limited to the above-mentioned embodiments, and various modifications are conceivable without departing from the gist of the present invention.

In the bus bar 5 in the first embodiment, the lead line 9 is joined to the portion to be connected 511 by ultrasonic welding. However, provided that the lead line 9 is connected to the portion to be connected 511, a method of connecting the lead line 9 and the portion to be connected 511 to each other is not particularly limited. Besides the ultrasonic welding, the lead line 9 and the portion to be connected 511 may be connected to each other by welding, pressure bonding or the like, for example.

Figure 8:
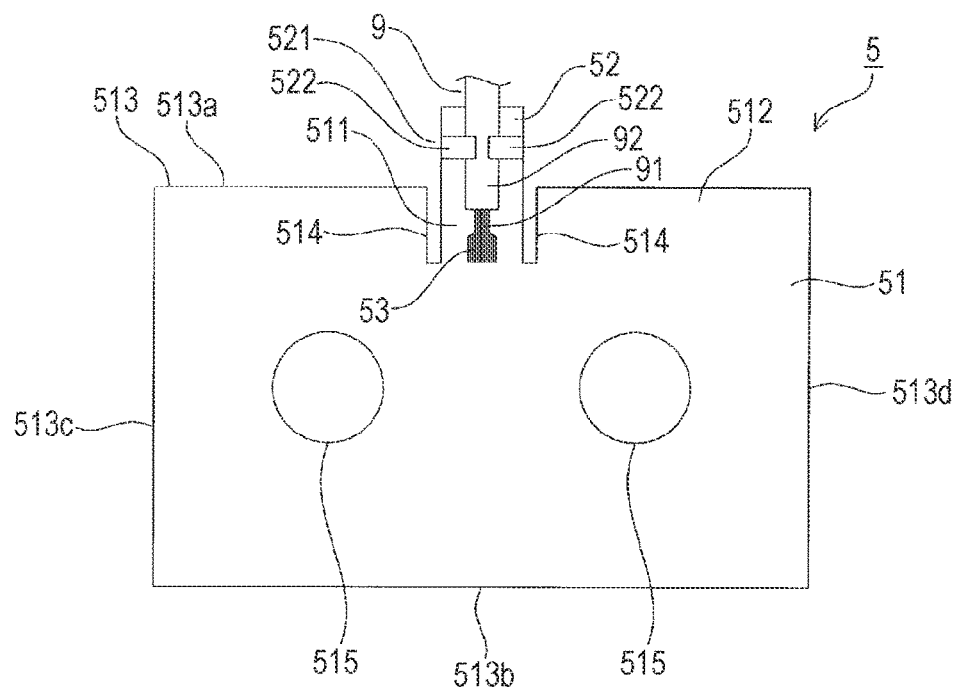
FIG. 8 is a plan view of a bus bar of an energy storage apparatus according to another embodiment of the present invention.

In the bus bar 5 in the first embodiment, the gap is formed between the portion to be connected 511 and the other portion 512 by forming one cut. Due to such a configuration, the portion to be connected 511 is disposed at one end portion of the bus bar body 51 in the direction that the pair of terminal connecting portions 515 is arranged. However, provided that the gap is formed between the port on to be connected 511 and the other portion 512 other than the portion to be connected 511, the number of cutes 514 is not limited to one, and two cutes 514 may be formed as shown in FIG. 8. In this case, the portion to be connected 511 is sandwiched between two cutes 514. That is, a corner portion of the bus bar body 51 including an intersecting point between the first side 513*a* and the third side 513*c* and a corner portion of the bus bar body 51 including an intersecting point between the first side 513*a* and the fourth side 513*d* are included in the other portion 512.

In the bus bar 5 in the first embodiment, the cut 514 is formed so as to extend linearly perpendicularly toward the second side 513*b* from the first side 513*a*. However, provided that the gap is formed between the portion to be connected 511 and the other portion 512 of the bus bar body 51, a shape of the cut 514 is not particularly limited. A size and a length of the cut 514 are not also particularly limited.

In the bus bar 5 in the first embodiment, the cut 514 is disposed outside the region 516 ranging from one terminal connecting portion 515 to the other terminal connecting portion 515 in the direction that the pair of terminal connecting portions 515 is arranged (see FIG. 4 and FIG. 5). However, the cut 514 may be disposed at the position where the cut 514 extends from the inside to the outside of the region 516 or may be disposed within the inside of the region 516.

Figure 9:
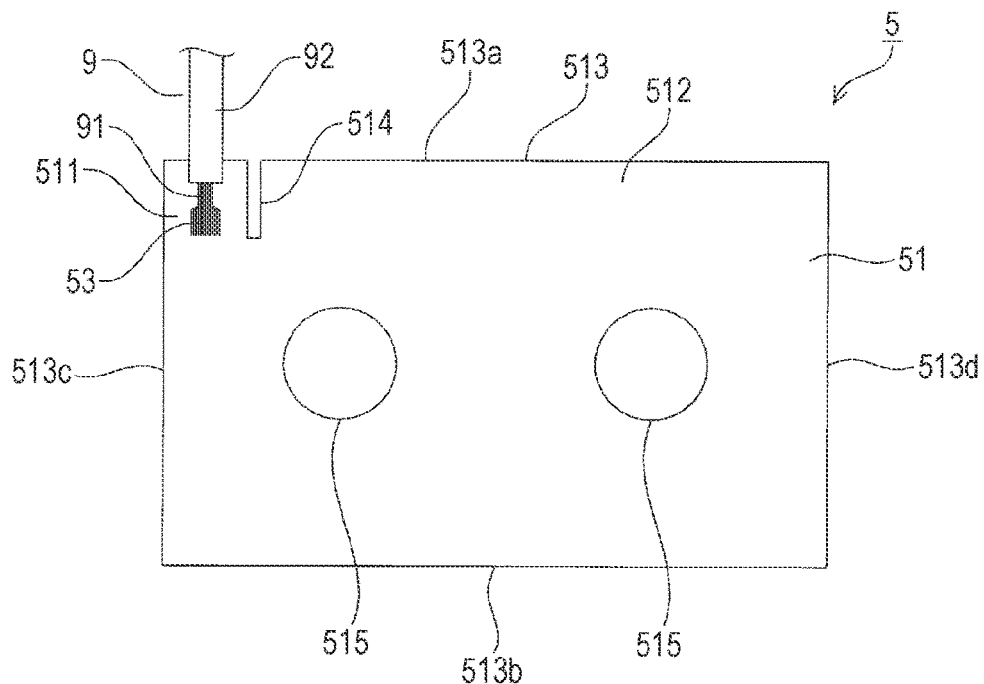
FIG. 9 is a plan view of a bus bar of an energy storage apparatus according to another embodiment of the present invention.

The bus bar 5 in the first embodiment includes the extending portion 52. However, in other embodiments, a bus bar 5 which does not include the extending portion 52 may be adopted as shown in FIG. 9.

Figure 10:
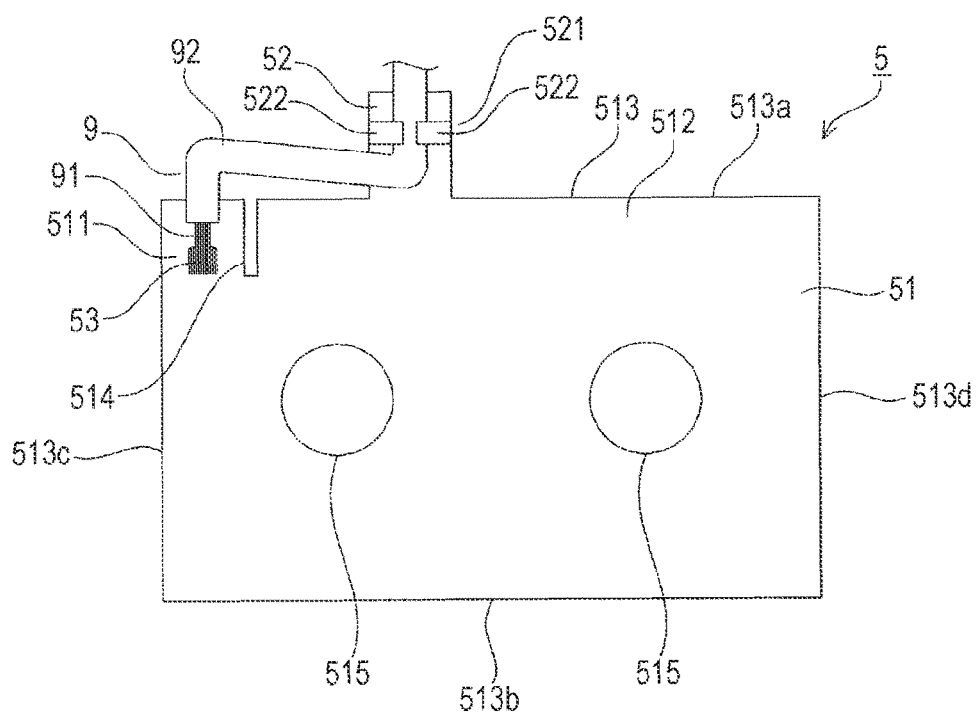
FIG. 10 is a plan view of a bus bar of an energy storage apparatus according to another embodiment of the present invention.

In the bus bar 5 in the first embodiment, the extending portion 52 is arranged at a position where the bus bar body 51 is connected to the portion to be connected 511. However, provided that the insulating portion 92 of the lead line 9 can be fixed in a state where the distal end 91 of the lead line 9 is connected to the portion to be connected 511, the arrangement of the extending portion 52 is not particularly limited. For example, as shown in FIG. 10, the extending portion 52 may be arranged at a position away from the portion to be connected 511. To be more specific, the extending portion 52 may be arranged at an intermediate portion of the edge 513*a*, that is, at a position of the first side 513*a* away from the third side 513*c* and the fourth side 513*d* inwardly. A size and a shape of the extending portion 52 are not also particularly limited.

In the bus bar 5 in the first embodiment, the extending portion 52 is disposed parallel to the bus bar body 51, and is not bent. However, in the same manner as the extending portion 54 in the second embodiment, the extending portion 52 may be bent such that the extending portion 52 overlaps with a region of the bus bar body 51.

In the bus bar 5 in the first embodiment, the extending portion 52 has the fixing portion 521. However, the extending portion 52 may not have the fixing portion 521. A portion of the bus bar 5 other than the extending portion 52 may have the fixing portion 521.

In the bus bar 5 in the first embodiment, the bus bar body 51 is formed into a rectangular shape. However, the shape of the bus bar body 51 is not particularly limited provided that the bus bar body 51 includes: the portion to be connected 511; the other portion 512; the edge 513; the cut 514; and the pair of terminal connecting portions 515.

In the bus bar 5 in the first embodiment, the bus bar body 51 and the extending portion 52 are integrally formed by cutting or punching. However, for example, the bus bar body 51 and the extending portion 52 may be formed such that the bus bar body 51 and the extending portion 54 are cut out or punched separately and, thereafter, the bus bar body 51 and the extending portion 54 are joined to each other by welding.

In the bus bar in the first embodiment, the extending portion 52 and the projecting portions 522 are integrally formed by cutting or punching. However, for example, the extending portion 52 and the projecting portions 522 may be formed such that the extending portion 52 and the projecting portions 522 are cut out or punched separately and, thereafter, the extending portion 52 and the projecting portions 522 are joined to each other by welding, and the projecting portions 522 are joined to the extending portion 52 by welding is bent.

In the energy storage apparatus of the second embodiment, the connecting portion 53 is formed on the first surface 518 of the extending portion 54 of the bus bar 5 which is in contact with the external terminal 11. However, besides the above-mentioned configuration, the connecting portion 53 may be formed on the second surface 519 of the extending portion 54 of the bus bar 5 which is not in contact with the external terminal 11.

In the bus bar 5 in the first embodiment, the lead line 9 is joined to the extending portion 54 by ultrasonic welding. However, provided that the lead line 9 can be connected to the extending portion 54, a method for joining the lead line 9 and the extending portion 54 to each other is not particularly limited. Besides the above-mentioned configuration, the lead line 9 and the extending portion 54 may be connected to each other by welding, pressure bonding or the like, for example.

In the bus bar 5 in the second embodiment, the extending portion 54 extends from the corner portion (end portion) of the bus bar body 51 including the intersecting point between the first side 513*a* and the third side 513*c* of the bus bar body 51. That, is, the third side 513*c* and one edge of the extending portion 55 are connected to each other. However, provided that the extending portion 54 is formed in a region where the extending portion 54 overlaps with the cover body 5 in a state where the extending portion 54 is bent, the extending portion 54 may be disposed at an intermediate portion of the first side 513*a*, that is, the extending portion 54 may be formed at a position inwardly away from the intersecting point between the first side 513*a* and the third side 513*c* and the intersecting point between the first side 513*a* and the fourth side 513*d*.

In the bus bar 5 in the second embodiment, the extending portion. 54 is bent such that the extending portion 54 is arranged substantially parallel to the bus bar body 51. However, provided that the extending portion 54 can be formed in a region where the extending portion 54 overlaps with the bus bar body 51, an angle made by the extending portion 54 and the bus bar body 51 is not particularly limited.

In the bus bar 5 in the second embodiment, the extending portion 54 is disposed outside the region 516 ranging from one terminal connecting portion 515 to the other terminal connecting portion 515 in the direction that the pair of terminal connecting portions 515 is arranged. However, in this embodiment, a cut is not formed in the bus bar body 51 and hence, a cross-sectional area (the cross-sectional area of an electric current path) in the region 516 does not change depending on a position where the extending portion 54 is formed. Accordingly, the extending portion 54 can be arranged without taking into account the cross-sectional area in the region 516. A size and a shape of the extending portion 54 are not also particularly limited.

Figure 11:
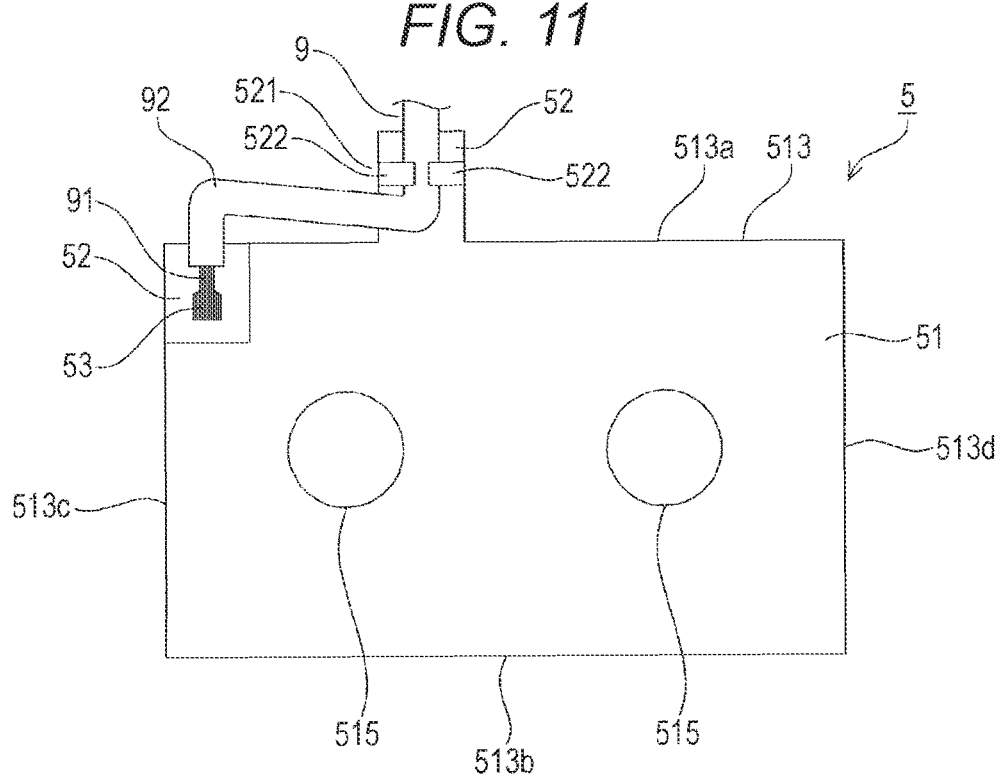
FIG. 11 is a plan view of a bus bar of an energy storage apparatus according to another embodiment of the present invention.
Figure 12:
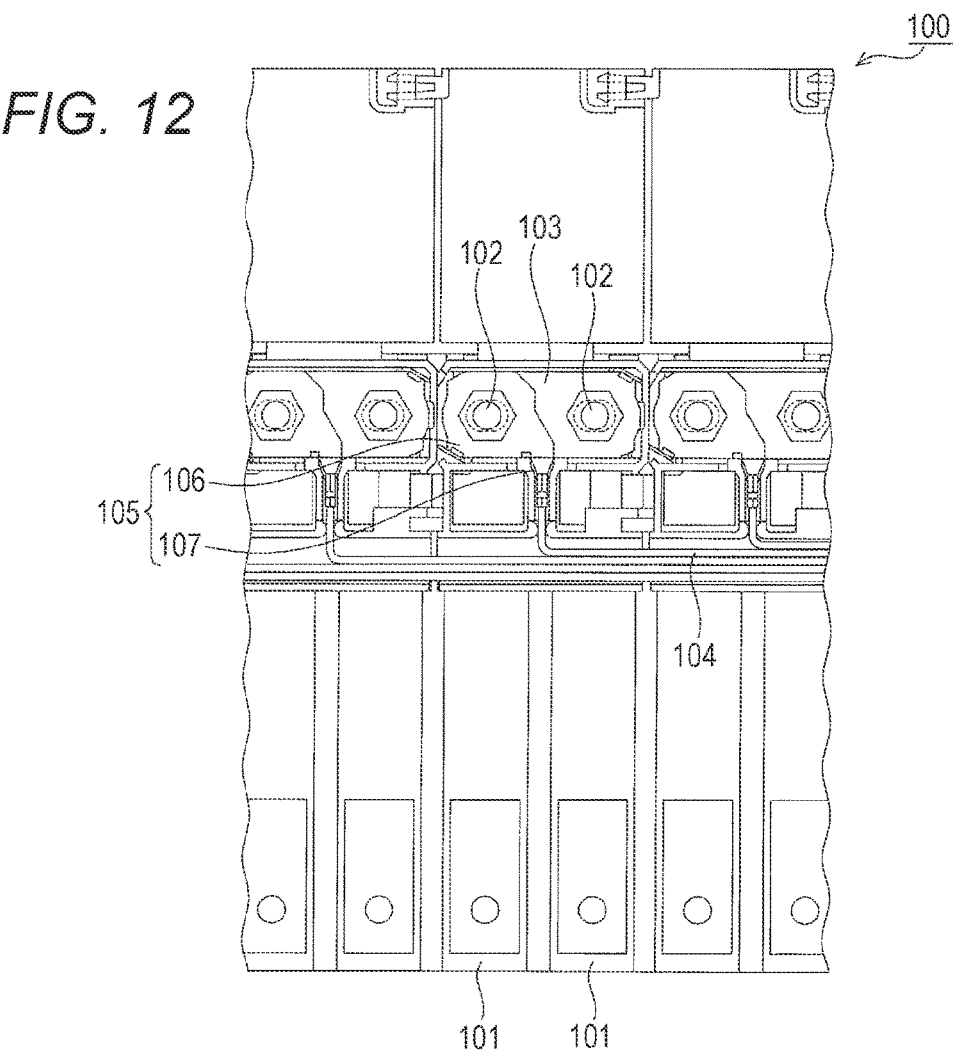
FIG. 12 is a plan view showing a bus bar of a conventional energy storage apparatus and an area around the bus bar.
Figure 13:
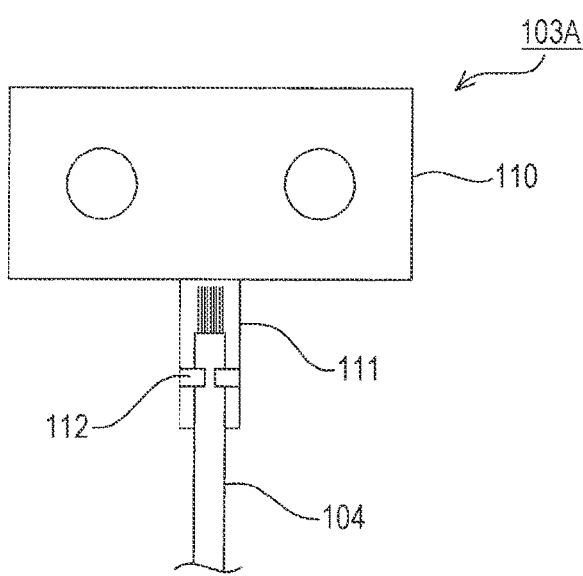
FIG. 13 is a plan view showing the bus bar of the conventional energy storage apparatus.

In the bus bar 5 the second embodiment, the extending portion having the fixing portion 521 is not formed. However, in the same manner as the configuration shown in FIG. 10 in the first embodiment, as shown in FIG. 11, in addition to the extending portion 54 on which the connecting portion 53 is formed, the bus bar 5 may include the extending portion 52 having the fixing portion 521 which fixes the lead line 9. Further, a portion of the bus bar 5 other than the extending portion 52 may have the fixing portion 521.

In the bus bar 5 in the second embodiment, the bus bar body 51 is formed into a rectangular shape. However, provided that the extending portion 54 and the pair of terminal connecting portions 515 can be formed on the bus bar body 51, a shape of the bus bar body 51 is not particularly limited.

In the bus bar 5 in the second embodiment, the distal end of the lead line 9 is connected to the extending portion 54 which is not in a bent state and, thereafter, the extending portion 54 is bent. However, provided that the extending portion 54 on which the connecting portion 53 is formed overlaps with a region of the bus bar body 51, the order of the connection and bending is not particularly limited. For example, the distal end of the lead line 9 may be connected to the extending portion 54 after the extending portion 54 is bent.

In the bus bar 5 in the second embodiment, the bus bar body 51 and the extending portion 54 are integrally formed by cutting or punching. However, for example, the bus bar body 51 and the extending portion 54 may be formed such that the bus bar body 51 and the extending portion 54 are cut out or punched respectively and, thereafter, are joined to each other by welding and are bent.

In the first and second embodiments, the bus bar 5 connects the external terminals 11 to each other. However, the bus bar 5 may connect the external terminal 11 and equipment outside the energy storage apparatus to each other.

In the bus bars 5 in the first and second embodiments, the respective terminal connecting portions 515 are formed of a through hole respectively, and the through holes are connected to the respective external terminals 11. However, the bus bar 5 may be connected to the respective external terminals 11 by welding. In this case, portions of the bus bar body 51 to be joined with the connecting rod 111 by welding may be used as the terminal connecting portions 515, or through holes may not be formed in the bus bar body 51.

In the bus bars 5 in the first and second embodiments, the portion to be connected 511 and the lead line 9 are joined with each other by ultrasonic welding. However, provided that the portion to be connected 511 and the lead line 9 can be electrically connected to each other, the portion to be connected 511 and the lead line 9 may be connected to each other by welding, pressure bonding or the like, for example.

What is claimed is:

1. An energy storage, apparatus comprising:
    an energy storage device including an external terminal;
    a bus bar electrically connected to the external terminal of the energy storage device; and a lead line electrically connected to the bus bar, wherein
    the bus bar includes a bus bar body which is in contact with the external terminal of the energy storage device and includes a portion to be connected where the lead line is connected to the bus bar, and an other portion which is contiguously formed with the portion to be connected,
    the bus bar body includes a first side and a second side which is arranged on a side opposite to the first side,
    the portion to be connected is located between the first side and the second side in a direction perpendicular to the first side, and
    the bus bar body has a cut extending beyond the portion to be connected toward the second side.

2. The energy storage apparatus according to claim 1, wherein
    the bus bar body is a plate member having an approximately rectangular shape.

3. The energy storage apparatus according to claim 2, wherein
    the portion to be connected is arranged at a corner of the bus bar body.

4. The energy storage apparatus according to claim 1, wherein
    the cut extends to an end portion of the bus bar body.

5. The energy storage apparatus according to claim 1, wherein
    the bus bar includes an extending portion extending from the bus bar body, and having a fixing portion which fixes the lead line.

6. The energy storage apparatus according to claim 5, wherein
    the lead line includes an insulating portion covered by an insulating member and a distal end portion where a metal line is exposed, and the fixing portion of the extending portion fixes the insulating portion.

7. The energy storage apparatus according to claim 5, wherein
    the portion to be connected is connected with the extending portion.

8. The energy storage apparatus according to claim 1, wherein
    the lead line is connected to the bus bar by ultrasonic welding.

9. The energy storage apparatus according to claim 1, wherein
    the energy storage device includes a first energy storage device including a first external terminal and a second energy storage device including a second external terminal,
    the bus bar body includes a first terminal connecting portion to which the first external terminal is connected and a second terminal connecting portion to which the second external terminal is connected, and
    the cut is formed in the bus bar body outside a region ranging from the first terminal connecting portion to the second terminal connecting portion in a direction in which the first terminal connecting portion and the second terminal connecting portion are arranged.

10. The energy storage apparatus according to claim 1, wherein
    a length of the cut is larger than a length of the distal end portion of the lead line in the direction that the distal end portion of the lead line extends.

11. An energy storage apparatus, comprising:
    an energy storage device including an external terminal;
    a bus bar electrically connected to the external terminal of the energy storage device; and
    a lead line electrically connected to the bus bar,
    wherein the bus bar includes:
        a first side and a second side which is arranged on a side opposite to the first side;
        a bus bar body which is overlapped with the external terminal of the energy storage device, the bus bar body including a first surface and a second surface opposite to the first surface, the first surface being in contact with the external terminal; and an extending portion which extends from the bus bar body and has a connecting portion connected with the lead line, wherein the extending portion is disposed in a region where the extending portion overlaps with the bus bar body as viewed in a direction in which the external terminal and the bus bar body overlap with each other such that a gap is formed between the extending portion on which the connecting portion is formed and the second surface of the bus bar body, and wherein the extending portion is located between the first side and the second side in a direction perpendicular to the first side.

12. The energy storage apparatus according to claim 11, wherein the connecting portion is formed on the first surface of the bus bar which is in contact with the external terminal.

13. The energy storage apparatus according to claim 11, wherein the extending portion is bent toward the bus bar body.

14. An energy storage apparatus, comprising:

a first energy storage device including a first external terminal;

a second energy storage device including a second external terminal;

a bus bar electrically connected to the first external terminal and the second external terminal; and a lead line electrically connected to the bus bar, the lead line having an insulating portion covered by an insulating member and a distal end portion where a metal line is exposed, wherein the bus bar includes:

a bus bar body formed of a plate member having an approximately rectangular shape, the bus bar body including a portion to be connected which enables the connection of the distal end portion of the lead line to the bus bar and is arranged at a corner of the plate member;

an other portion contiguously formed with the portion to be connected;

an extending portion extending from the bus bar body and including a fixing portion which fixes the distal end portion of the lead line;

a first terminal connecting portion to which the first external terminal is connected; and a second terminal connecting portion to which the second external terminal is connected, wherein the bus bar body has a cut which is formed in the bus bar body between the portion to be connected and the other portion outside a region ranging from the first terminal connecting portion to the second terminal connecting portion in a direction in which the first terminal connecting portion and the second terminal connecting portion are arranged, and the cut extends to an end portion of the bus bar body.

15. The energy storage apparatus according to claim 14, wherein a length of the cut is larger than a length of the distal end portion of the lead line in the direction that the distal end portion of the lead line extends.

* * * * *